B. T. REYNOLDS.
DROPPING PLATFORM FOR HARVESTERS.
No. 103,370. Patented May 24, 1870.
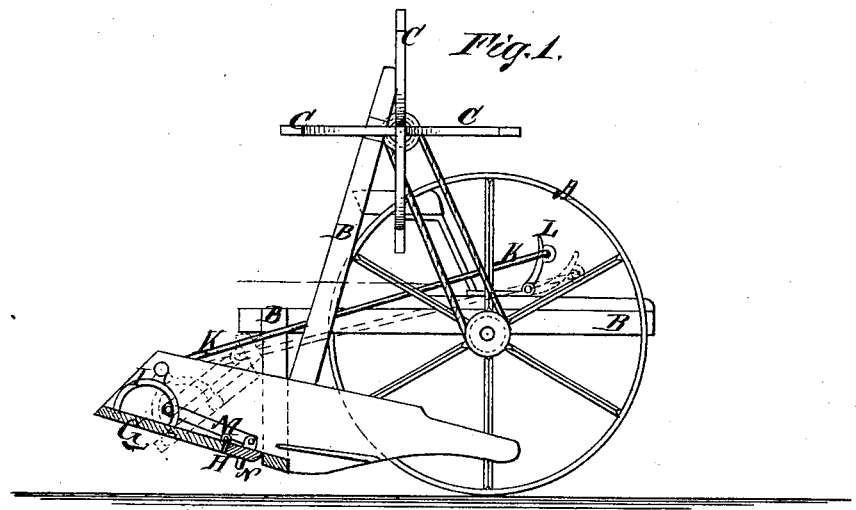
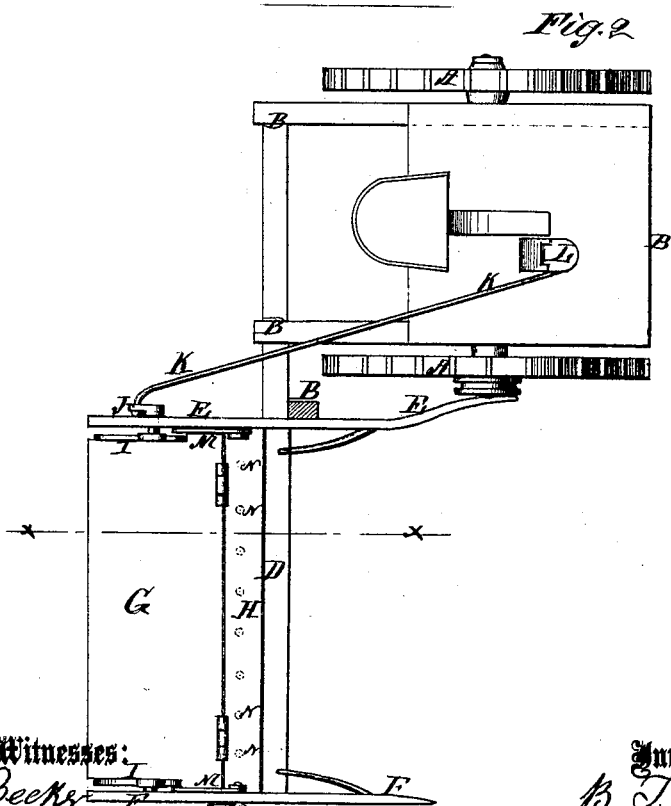

United States Patent Office.

BARTIN T. REYNOLDS, OF CENTREVILLE, INDIANA.

Letters Patent No. 103,370, dated May 24, 1870.

IMPROVEMENT IN DROPPING-PLATFORM FOR HARVESTERS.

The Schedule referred to in these Letters Patent and making part of the same

*To all whom it may concern:*

Be it known that I, BARTIN T. REYNOLDS, of Centreville, in the county of Wayne and State of Indiana, have invented a new and useful Improvement in Dropper Attachment for Reapers; and I do hereby declare that the following is a full, clear, and exact description thereof, which will enable others skilled in the art to make and use the same, reference being had to the accompanying drawing forming part of this specification, in which—

Figure 1 is a detail vertical section of my improved dropper, taken through the line $xx$, fig. 2.

Figure 2 is a top view of the same.

Similar letters of reference indicate corresponding parts.

My invention has for its object to furnish an improved dropper attachment for reapers, which shall be so constructed as to drop the gavel with the butts of the grain even, and which shall evenly separate the gavel from the grain being cut while the gavel is being dropped; and It consists in the construction and combination of the various parts of the dropper, as hereinafter more fully described.

A represents the drive-wheels, B the frame-work, C the reel, D the cutter-bar, E the inner guard, and F the outer guard or divider, about the construction of all of which parts there is nothing new.

G H is the platform that receives the grain from the cutters.

The platform G H is made in two parts, hinged to each other at the adjacent edges, as shown in figs. 1 and 2. The rear and wider part G of the platform has bails, half-circles, or other arms, I, attached to its ends, the upper or middle parts of which are attached to journals working in bearings in the upper rear parts of the guards E F.

To the projecting end of the journal working in the inner guard E is attached, or upon it is formed, a crank, J, to the crank-arm of which is pivoted the end of the connecting-rod K, the other end of which is pivoted to the foot-lever L, the lower end of which is hinged or pivoted to the frame B, in such a position that it may be conveniently reached and operated by the driver with his foot.

To the ends of the narrow front part H of the platform G H, or to ears attached to said ends, are pivoted the forward ends of the rods or bars M, the rear ends of which are pivoted to the guards E F, below and a little in front of the journals of the bails I.

The lower front edge of the narrow front part H of the platform G H is beveled off, and to the under side of said part H are attached fingers or prongs, N, projecting two inches, more or less, which fingers are designed to prevent the grain from becoming tangled while operating the platform.

By this construction, when enough grain has been received upon the platform to form a sheaf, the driver presses upon the lever L with his foot. This swings the platform G H forward, raising its upper edge so that the gavel may slide from the platform to the ground. As the platform is swung forward the rods or bars M cause the part H of the platform to turn upon its hinges, causing its forward edge to move upward and backward faster and farther than the part G moves. This separates the gavel from the falling grain, and supports the said falling grain while the gavel is sliding from the platform. As the gavel slides from the platform, the said platform is allowed to swing back to its place, the front part H slipping down beneath the falling grain, the teeth or fingers N preventing the said grain from becoming tangled.

Having thus described my invention,

I claim as new and desire to secure by Letters Patent—

The combination, with hinged and swinging platform G and beveled strip H, having fingers N thereon, of crank J, rod K, and foot-lever L, all constructed, arranged, and operating as described, and for the purpose of receiving, separating the straw, and then delivering the butts evenly, as set forth.

BARTIN T. REYNOLDS.

Witnesses:
LEWIS FORKNER,
F. V. SNIDER.